United States Patent [19]

Seailles et al.

[11] Patent Number: 5,266,141

[45] Date of Patent: Nov. 30, 1993

[54] PROCESS FOR TRANSFERRING BY FLOTATION A DECORATIVE DESIGN ONTO OBJECT-SUPPORTS AND DEVICES FOR IMPLEMENTING THIS PROCESS

[76] Inventors: Pierre Seailles; Brigitte Seailles, both of 29 Rue de Saint Cyr Le Bouc Etourdi, 78730 Longvilliers, France

[21] Appl. No.: 598,197

[22] Filed: Oct. 16, 1990

[30] Foreign Application Priority Data

Oct. 17, 1989 [FR] France .................... 89 13661

[51] Int. Cl.$^5$ ............................ B32B 31/12
[52] U.S. Cl. ..................... 156/230; 156/155; 156/236; 156/540
[58] Field of Search ............ 156/155, 230, 235, 236, 156/238, 277, 540

[56] References Cited

U.S. PATENT DOCUMENTS

| | | | |
|---|---|---|---|
| 2,489,987 | 11/1949 | Barnola | 156/235 |
| 3,554,834 | 7/1968 | Benett et al. | 156/230 |
| 3,871,293 | 3/1975 | Valiela | 156/540 |
| 4,010,057 | 3/1977 | Nakanishi | 156/230 |
| 4,229,239 | 10/1980 | Arai et al. | 156/238 |

FOREIGN PATENT DOCUMENTS

1137346  6/1955  France .

*Primary Examiner*—Robert A. Dawson
*Assistant Examiner*—David Reifsnyder
*Attorney, Agent, or Firm*—Jacobson, Price, Holman & Stern

[57] ABSTRACT

The invention has for an object a process for obtaining a reproducible decoration involving the floating of a pattern on the surface of a liquid characterized in that a "text-object" is selected or made, the surface of which is either essentially flat or volumetric (non-flat) with varied motifs as desired, in that the text-object is sprayed with powdered dyes in suspension in a liquid vehicle, in that the object thus obtained is immersed in a liquid (generally water) in such a manner that the pigments or other dyes float to the surface of the liquid in the form of a text-film, and in that said text-film is transferred to the final support. It has also for an object a device which comprises a receptacle containing the liquid for floating the object-film, means for immersing and lowering a pre-inked flat or non-flat text-object into the liquid, so that the dyes prearranged on the object-film float to the surface of the water to form there the text-film, means for placing the support to be decorated under the surface to which the text-film floats, and for making this support ascend until it collects the text-film, means for removing the decorated support, as well as means for removing the text-object from the liquid in order to allow, if necessary, re-inking before re-immersion with a view to series production.

11 Claims, 5 Drawing Sheets

FIG. 8
(POSITION I)

FIG. 9
(POSITION II)

FIG. 10
(POSITION III)

PROCESS FOR TRANSFERRING BY FLOTATION A DECORATIVE DESIGN ONTO OBJECT-SUPPORTS AND DEVICES FOR IMPLEMENTING THIS PROCESS

GENERAL OBJECT OF THE INVENTION

The present invention concerns a process for transferring by flotation a decorative design onto object supports of very diverse nature and in particular onto glasses, ceramic items, etc., possibly intended to undergo firing. The invention also concerns devices for implementing this process.

BACKGROUND OF THE INVENTION

It has already been proposed to this effect to form on the surface of a liquid bath (in general water) floating decorative designs which are picked up on various supports onto which they fix. Among the known processes, mention is made in particular of that described in French Patent No. 1 137 346, applied for on 16 June 1954 in the name of Jean-Charles SEAILLES. In this patent, the specially described is that in which the decoration floats and has to be incorporated in a material which may impregnate it following its deposition on a suitable support. In all of these known techniques, the pigments, colours and inks are first put in suspension or in solution in liquids, such as oils, varnishes, solvents, etc., which are then poured onto the water, creating at its surface a film which is often of an oily consistency and in which chance plays the main role in the final distribution of the colours and gives an image of action painting to the decoration obtained. In other words, the known methods of decoration by flotation do not in any way make it possible to obtain on the water a film which carries predetermined lines, such as those of a drawing or a precise image, and even less to distribute in a deliberate fashion the colours (as is done in lithography, screen printing, etc.).

DEFINITION OF THE INVENTION.

The aim of the invention, among other things, is to eliminate the chance nature of the decorations produced by the aforementioned known processes, and to obtain on the contrary, by flotation, a film in which the graphic patterns and colours, however complex they may be, can be entirely induced and controlled, everything being done as desired; this enables on the one hand mass-production, which is always attractive from an economic standpoint and on the other hand, in certain characteristics, the introduction during operation of any possible corrections and alterations which may be desired. On looking into the matter, there was conceived the idea, the basis of the invention, to prepare a flat or non-flat mat or printing form (subsequently referred to as the "text-object" in the description), and then to ink it; to immerse the inked "text" in a bath of liquid in order to form, by flotation, a "text-film" at the surface of said liquid which faithfully reproduces the patterns of the "text", and lastly to transfer onto a final support said text film. The tests performed have shown that, in these circumstances, first the aim sought was perfectly achieved and secondly that the text-object could, within broad limits, have a flat surface or on the contrary a surface with a very irregular relief. This observation, which was at first quite unexpected, came in fact from the information supplied by the current methods of printing in which it is necessary to pay special attention to the regularity and small size of the relief acceptable on the mats used which have a perfectly flat surface. This irregular surface which is characteristic of the process forming the subject of the invention provides a very simple way of making corrections or alterations to the text-object, possibly full or local changes of scale, which widens considerably the possibilities of application of the process. It is, furthermore, possible to combine the two types of text-object in a single surface. In the case that the "text-object" is said to be flat, any relatively flat surface is suitable, the relief is never subjected to any requirement of horizontal flatness or of dimensions, unlike the practice in printing, the differences in level of the order of 0 to 5 mm are normal, as well as the distortions of the overall relief. Greater differences in level are possible, in particular when the surface of the text-object is large. As an example of usable "surfaces" we can cite bas-reliefs in art, engravings, printing plates, tree bark, flowers, sea-shells or any groups of such objects to form a relatively flat surface. If a non-flat text object is desired, any natural or artificial object can be used, for example tree branches, grass which is more or less dried, foliage or sculptures or arrangements of wire, netting, mesh, materials, assemblies of miscellaneous objects (provided that the appearance is not too massive). There are no limits to the size and shape of the objects which can be used, but in general the thickness of the text-objects does not exceed approximately 30 cm, and as regards their surface area, this generally does not exceed ½ square metre, so as to be easy to handle. Once the text-object has been prepared, whether flat or not, (which would be the mat or the printing form in printing) it is necessary to carry out inking. The products used for inking are usual pigments, either used as a dry powder or placed in suspension in a suitable liquid vehicle composed of solvents to which are generally added binders (oils, resinified oil, varnishes, fats). The liquid vehicles are made of a main solvent, either water-mixable (such as alcohol, esters, acetone), possibly with the addition of binders, a linseed oil, varnishes or non-water mixable, which are generally hydrocarbons. Of course, these two types of vehicle may be mixed: simple tests can then be used to "dose" the mixtures. Highly-diluted alcohol, or even pure water, can be used as the vehicle, whereby either the powders or pigments used float easily, for example certain metallic powders, or the spraying of the water pigments is followed by the spraying of a liquid comprising solvents plus binders. The mixture of pigments/vehicle must be agitated energetically in order to form a homogeneous suspension during inking.

In the invention, inking is effected by dry or aqueous spraying of the various colours, simultaneously or one after the other, on to the text-object. If the liquid base is water as usual, it is very important that the text-objects should always be well damped (covered or impregnated with water or a hydrophic product) prior to inking. When inking with pigments used in the dry state, spraying is effected separately on the text-object, the liquid vehicle and the pigments. It is preferable to spray at least two colours. It is important to note that, since the text-object is held in a fixed position, the spraying may be performed from any side of the text. Conversely, the text can be moved in relation to the spray elements, which may prove very attractive in machine-operated or even manual operations. In accordance with another characteristic, it is recommended that dark colours are sprayed more copiously by directing the jet towards one of the sides of the text-object and that the spray jet for lighter colours is applied towards the other side of the text object: in this way, the totality of the text surfaces will definitely be covered with pigment. Finally, it is possible to "manipulate" with contrasting tones of sprayed colours to obtain, by a play of light, effects which produce a "high-fidelity" reproduction, and the appearance of relief by "trompe-l'oeil". An additional rule is that in the case of "flat" text-objects, it is preferable to direct the jets almost parallel to the surface of the "text". The time required to "ink" a text of normal dimensions does not exceed 5 minutes when working in an artisanal manner, and much less when the automatic apparatus described below is used. Once the text object has been completed, whether it is flat or not, work is started on the printing proper, which is performed in two successive operations, namely: first, the transfer of the pigments of the text-object to the surface of the water contained in a suitable receptacle, and secondly, the transfer of the film on to the final support. After the first operation the "text" to be printed floats on the surface of the water which forms the "text-film"; this is then transferred to the final support, in the known manner, for example by that of the above-mentioned French Patent of SEAILLES No. 1 137 346 or preferably by automatic means. It is generally preferable to form, on the surface of the liquid (generally water) a pre-treatment film which does not offer any resistance, such as a thin coating of talc, or paraffin, or wax, or oil, or a sprayed vehicle, either pure or with pigments on the surface of the water, etc., or a "brittle" film (see below). In the liquid contained in a receptacle of dimensions matching those of the supports to be decorated, and covered with the latter pretreatment coating (which might, if necessary, be itself a text-film), the text-object is depressed by any means desired; as immersion takes place, the sprayed inkings separate from the text-object and float as a "text-film" which faithfully reproduces the graphic patterns of the text object.

Progressive immersion destroys or partly displaces the pre-treatment film which, possibly, falls to the bottom of the receptacle; the part or parts of the pre-treatment film which have not been moved or have not been destroyed keep the object-film at the surface of the water, preventing any serious distortion of the text-film. The latter, held on all sides, is now capable of being transferred to its final support, the graphic pattern remaining intact and faithful. In the case of a non-flat text-object, the latter may present, because of its many "reliefs", a large number of sides from which it can be pressed into the water. After being inked on all sides, this text-object, depending on its relief (tree branches, sculpture or other) will deposit on the surface of the water (in the form of a text-film) different graphic patterns depending on the side by which it has been pressed into the water. This is like a sculpture which can be looked at or photographed from various sides. This is because when this non-flat text-object (bonzaï, sculpture, wire asembly) is moved parallel to the surface of the water as it is being immersed, the first parts of said text-object destroy or move the pre-treatment film (if there is one) and deposit in its place a text-film, then, as immersion continues, other parts of text-film are deposited which destroy or move, in full or partly, the text-films previously deposited, replacing them by their respective graphic patterns, and this goes on and on until the text-object has been fully immersed. Depending on the side by which the object will begin to be immersed, it is thus possible to change as desired, either on sight or after a few tests, the final pattern. In this way, firstly this is quite different from the random "action painting" results obtained by the common processes, and secondly the achievement of the desired pattern (even in mass production) is greatly simplified.

The text-films floating on the surface of the water must then be transferred to their final support. The collection means and the supports may be those which are already described by the known techniques, such as in the already-mentioned SEAILLES patent; for them to be usable in accordance with the invention, it is sufficient that their surface enables the adhesion of the film concerned. The transfer of the text-film is effected generally by manual or mechanical collection. It is recalled that the collection, which is well known per se, consists in introducing the support under the surface of the bath and in raising it progressively to remove, by lifting, a part or whole of the pattern formed on the surface of the water; it is known that it is generally preferable to give the support an inclination in relation to the surface of the liquid bath, but the best inclination depends on the nature of the text-film and support used. In certain variants, this support can be raised almost vertically. It is possible to consolidate or fluidify the text-film when it is still floating on the surface of the liquid by spraying a varnish or any other suitable liquid. Obviously, it is also possible to effect a double transfer by first depositing the text-film on an intermediate support to which said film only poorly adheres; the film can be possibly consolidated by a suitable varnish. Next, the film can be transferred to a final support by sticking, decalcomania or other means, either in part or whole. Finally, for reasons of ease of manufacture, spraying or other, it is possible to recover momentarily a text-film, for example by collection on a temporary support, generally flat, and redeposit it later on water in a tray.

To facilitate implementation of the process in accordance with the invention it is advantageous to classify the text-films as follows, depending on their consistency at the surface of the water: flexible and elastic text-films, and brittle text-films, and highly cohesive text-films. a) Flexible and elastic films: these films (solvents plus binder, but without powder) are more or less contractable and expandable; if such a film covers the totality of the water contained in a receptacle and if the walls of the receptacle are moved closer or further away, the thickness of the film varies but covers in a homogeneous fashion the totality of the surface available between the walls of the receptacle. If one adds to these solvents powders, (pigments, etc.), the films thus obtained retain a major part of these properties, particularly as regards shrinkage; thus any pattern on the text-film is enlarged or shrinks depending on the positions of the walls (anaphonism). These flexible films are generally obtained from a principal solvent (alcohol, essence, etc.) to which have been added various binders, such as oils (linseed oil, paraffin oil, etc.), solvents and various products with a greasing or adhesive powder (waxes, resins, particularly acrylic resin, certain varnishes, greases, adhesives etc . . . ) In this type of film, the particles of dye floating on the surface of the water are coated and surrounded by a thin, more or less oily and tacky film, and the cohesion of the film is very different from the brittle films. Such text-films may sometimes enlarge and more generally contract on the surface in a significant manner, without distortion or hysteresis. As a result of these properties, said films may undergo, at the surface of the water, numerous deformations, manipulations, displacements, partial deletions or additions of film, addition of pigment, etc., the pattern being legible and recognizable. This is of definite interest for indicating that the decorated supports belong to one and the same family or industrial origin. Flexible and expandable films have a great number of uses owing to these properties, and they are particularly suitable for decorating ceramics, faience and porcelain.

b) Brittle films, made in particular from an "alcohol" vehicle with little or no binder (the dye particles in this case are simply placed side by side on the surface of the water; their cohesion is due to low surface tensions). They may thus act as films for pre-treating the surface of the water; they break on extension and form greases during contraction. These brittle pre-treatment films may be colourless and transparent, may contain colour pigments, have a graphic design, i.e. as a brittle text-film. Furthermore, they may be totally destroyed when the text-object is plunged into the water, in which case they only serve to maintain the text-film on a limited surface area of the water of the receptacle. Finally, they may be only partly destroyed by immersion of the text-object if the latter has discontinuities (for example tree branches). If the pretreatment film has a colouring or a graphic pattern, this will then remain apparent in the zones of discontinuity and will be included in the text-film enriching it with decorative effects which may be important.

c) Highly cohesive text-films: these are made from vehicles that comprise binders which harden rapidly, by evaporation of the solvents or by polymerization, as soon as they are put in contact with air.

These films are not brittle, not contractable, not decontractable; they form more or less rapidly on the surface of the water a film which is more or less hardened and therefore only slightly deformable or not at all; this latter feature may be valuable if it is virtually essential to avoid any distortion of the text-film. It is quite clear that the precise demarcations between the three types of film mentioned above are not clear; in reality, there is a gradual progression from brittle films (i.e. without binders) to films which are increasingly flexible (by the addition of suitable solvents and binders). By making tests, it is easy to determine the right mixtures which satisfy a given requirement. Below are described various methods of preparing the text-objects (whether flat or not), followed by an example for making a device for the mechanical implementation of the process of the invention. For a flat text-object, a bas-relief advantageously of plaster is used or made, having a surface area of about 2000 cm$^2$, which represents any desired motif, and whose relief does not exceed about 1 cm. When a manual implementation of the process is envisaged, the bas-relief is provided with two handles for manipulation. The weight of the bas-relief should not be too great so that it can easily be kept horizontal by its handles.

In the case of a non-flat text-object, it is possible to use wide-meshed wire netting (for example of the type used for hen-rungs), with a surface area of about 45 cm along the side; the netting is held flat, and whatever is to serve as the motif for printing is then placed on it: for example a few branches, already cleaned and washed, well furnished with thin twigs and having a decorative aspect of the bonzaï type, so that these branches cover almost all of the surface of the netting over a thickness of between 0 (region possibly without branches) and about 15 cm. The various branches can be intermingled, and to ensure that the netting/branch assembly is integrally secured and can be manipulated, thin fine copper wires are provided to hold the branches firmly against the netting; there is nothing against compressing slightly the "text-object" to ensure this solidarity. The density of the assembly must be sufficient to ensure that it sinks naturally into the liquid (water of the treatment tank) and the text-object will possibly be weighted for this purpose. In the case of a manual transfer, two wires are attached to the netting to serve as a handle in order to hold the assembly above the water and allow it to descend slowly.

Another example of a non-flat text-object can be obtained from a metal fabric measuring between 50 to 60 cm along the slide, having a fine mesh as is used for sieves; the fabric is creased, folded and possibly has fabric cuttings, with the result that it has a complex surface consisting of dips, humps, and folds, in which the differences in level are of the order of between 0 and 8 cm approximately, and in which the surface area after creasing is about 2000 cm$^2$ approximately.

In its most general form, a device for implementing the process according to the invention is characterized in that it comprises a receptacle containing the flotation liquid, a text-film, means for immersion and for descending into the liquid a flat or non-flat pre-inked text-object, so that the dyes pre-arranged on said object float to the surface of the water to form the text-film, means for bringing the support to be decorated under the surface to which the text-film floats, and for raising this support until it collects said text-film, means for taking out the decorated support, as well as means for removing the text-object from the liquid in order to allow, if necessary, its re-inking before further immersion as part of series-production.

Such a device, can for example, comprise a tank for the water, possibly with the addition of solvents or cleaning agents in which are rotated in two perpendicular planes, firstly in the horizontal plane, means for carrying the inked object, and secondly in the vertical plane for ensuring progressively immersion of the text-object in the water so as to deposit the text-film on the surface of the water and by inversion of the rotation, means (the object to be decorated) in order to collect from underneath the text-film deposited on the surface of the water, the latter means being controlled in respect to the downward and upward movement and in inclination depending on the movements of the text object carrier and as regards rotation in order to ensure the respective positioning of the inked text-object carrier, and then of the text-film collector on the water surface.

A description has been given below of the preparation of a text-object with a view to its inking before printing on a support. The text-object which comprises the graphic pattern to be transferred in accordance with the invention was cleaned and first immersed in a receptacle full of water and then allowed to drain. It is then placed on a suitable support, preferably in a spray booth, so that the spraying can if necessary be effected on both sides of the text-object. First, the dye vehicle is prepared, by mixing for example with 1 litre of denaturated absolute alcohol about 10 cm$^3$ of concentrate of turpentine essence plus 50 cc of "C" essence, plus 5 cc of turpentine essence, plus 5 cc of decolorized linseed oil. For an artisanal-type operation using for example 6 pigments, each of the six bottles are filled with about 20 grams of one of the pigments which will be maintained in suspension in about 40 to 50 cc of the above-mentioned vehicle, while agitating the bottle energetically, for example with a mechanical stirrer in order to maintain the homogeneity of the suspension. The pigments (and the vehicle) can possibly be sprayed separately on the text-object starting preferably with the spraying of the vehicle If the support on which the text-film is collected has to undergo firing (for a ceramic, glass or other material), the pigments used must naturally be pigments which are suitable for firing. It will be remarked that the pigments selected may have been treated to increase their floatability, which is in general the case of the pigments used on ceramics. A seventh bottle will contain only the vehicle without pigment (approximately 30 cc). The text-object is then sprayed with the various suspensions of pigments in the vehicles. In the case of a flat text-object, spraying is effected preferably from an angle close to horizontal. The dark colours are preferably on one side of the text-object and the light colours on the opposite side, so as to cover without any excess the entire text-object with pigments. The contents of the seventh bottle are sprayed onto the surface of the bath. The latter is thus covered with a pre-treatment film having good cohesion. The inked text-object is then immersed in the liquid, as already indicated, and the final support is placed under the text-film, which is deposited on the surface of the support.

In the case of a non-flat text-object, the various dyes envisaged are sprayed in turn, tilting each time the spraying element in accordance with the inclination of the relief surfaces of the text-object; in this case, it may often be advantageous to arrange the text-object vertically to allow spraying on both sides of the object.

BRIEF DESCRIPTION OF THE DRAWINGS

In the attached drawings:

FIGS. 3 to 10 represent an example of the mechanical device for implementation of the process of the invention, namely:

FIG. 3 is a cross-section showing the transfer device consisting essentially of an oscillating elevator and a server equipped with two trays which pivot around a vertical axis. The whole is inserted in a cylindrical tank filled with water in which the "text-film" should float;

DETAILED DESCRIPTION OF THE INVENTION

Figure 3:
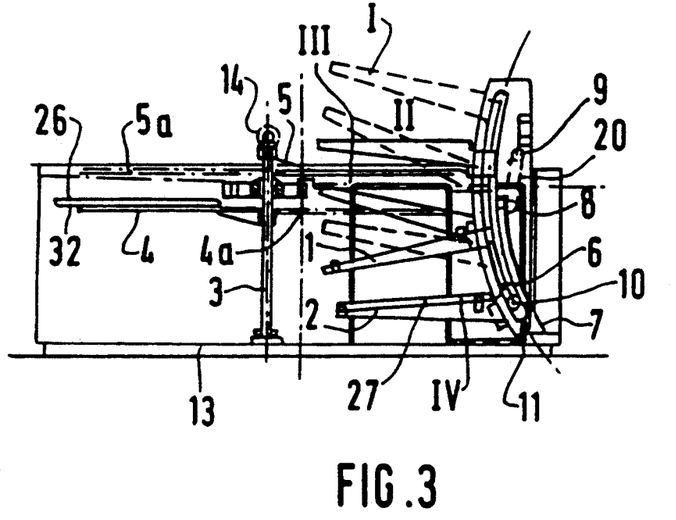
Figure 4:
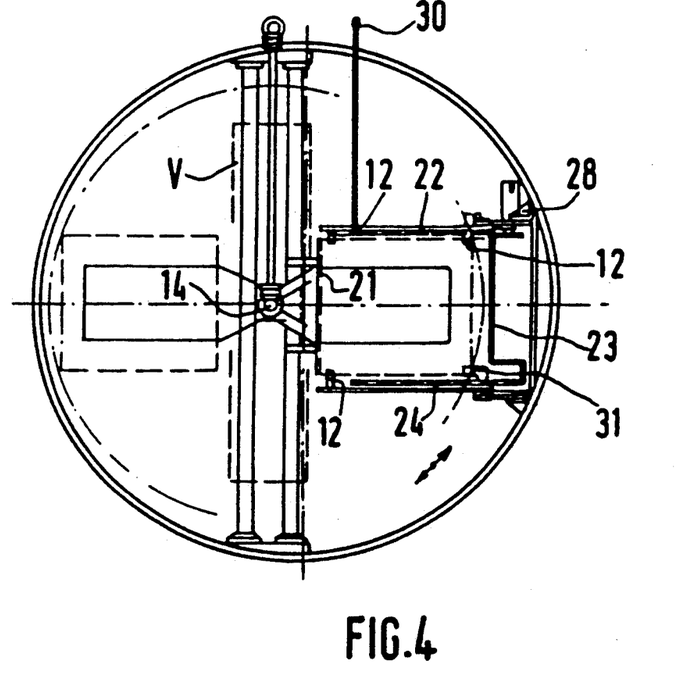
FIG. 4 is a plan view, showing a server tray loaded with the "text-object", the other tray being in the receiving position of the former "text-object" after deposition of the text-film on the water.
Figure 5:
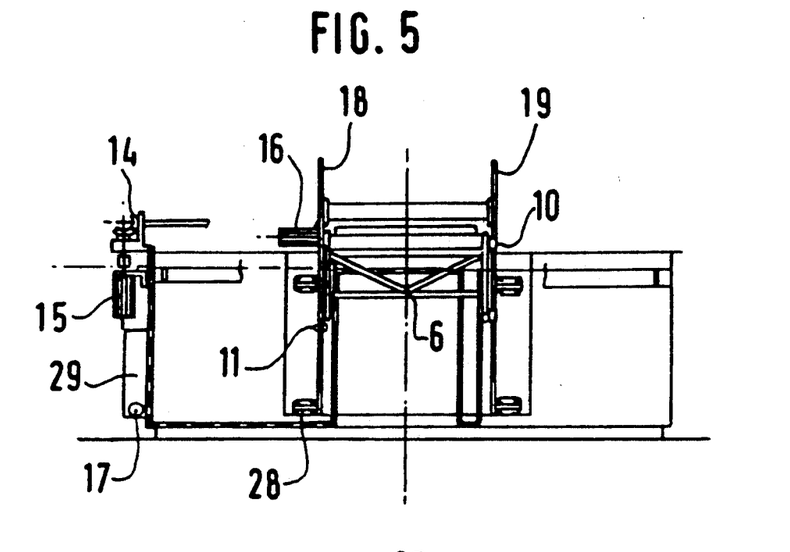
FIGS. 5 and 5a represent a cross-section showing the water and air circuit required for maintaining the "text-film" in position between the arms of the elevator.

When referring to FIGS. 3 to 5, it can be seen that the transfer device consists essentially of an elevator moving in a vertical plane and of a server pivoting around a vertical axis 3.

-the elevator comprises two pairs of arms 1 and 2 secured by two plates on which will be fixed the guide rollers and the rack for translational movement. A structure, for example a fabricated welded structure 6 maintains, in a manner preventing distortion, the two pairs of arms at the desired distance apart (about 1.2 metre for deposition of a text-film of one square metre).

-The server comprises two plates 4 and 5 designed to receive the "text-objects". The server and its rotation mechanism are held in position by two metal sections secured to the cylindrical tank 13. On one of the sections is fitted a strip 21, which serves to hold in position the graphic design deposited on the water.

The assembly is placed in a cylindrical tank 13 filled with water, of sufficient diameter to allow deposition of a "text-film" of the order of a square metre.

The elevator is guided in its translational movement by the fixed side-pieces 18 and 19 with the aid of rollers 10, located in the circular recess in each fixed side-piece. Four anti-tip rollers 11, fixed in pairs on each arm of the elevator prevent any transverse movement of the elevator during its translation. This absence of transverse movement is necessary at the moment when the text-film is deposited on the water. The elevator is driven by a rack and pinion system 8/7, powered by a motor 16 via a chain 20 and/or a drive-gearwheel 9. For reasons of mechanical loading, the rack is placed on the same side of the elevator as the anti-tip rollers.

FIG. 3 shows an example of the transfer device equipped with a mechanism enabling the slope angle to be varied in the downward direction of the "text-object" then, in the upward direction to vary the slope angle of loading (pallet of objects to be decorated). This angle of slope can be adjusted by modifying the position of the fixed side-pieces 18 and 19 by adjusting the fixing of the angle-pieces 28. In FIG. 3, the fixed side-pieces are in a vertical position. The pair of arms 1 is equipped with tabs 12 and 13 to ensure, during elevator rotation, the engagement of the "text-object" support. The assembly of the text support consists of a support frame 26 which rests, by means of four feet, on a tray 32 located 5 cm below the support frame. The purpose of the pan is to recover any dirt or foreign bodies which might drop into the water during the transfer of the graphic pattern onto the water or during the cleaning of the film/water interface by the water jets. In this way any such dirt or foreign bodies cannot be deposited on the objects to be decorated, which are arranged on the pallet 27 located below.

The server, comprising an upper tray on which he "text-object" is located and a lower tray intended to recover the same "text-object" after immersion in the water, is guided rotationally by bearings and a ball-type thrust bearing. The assembly is operated by a motor 15 via two bevel couplings 14. Synchronisation of the movements of the elevator and server is ensured by electric cams 17 located in the control unit 29, the limit switches of which are connected to motors 15 and 16 and to the electrically-operated valve 30.

Figure 1:
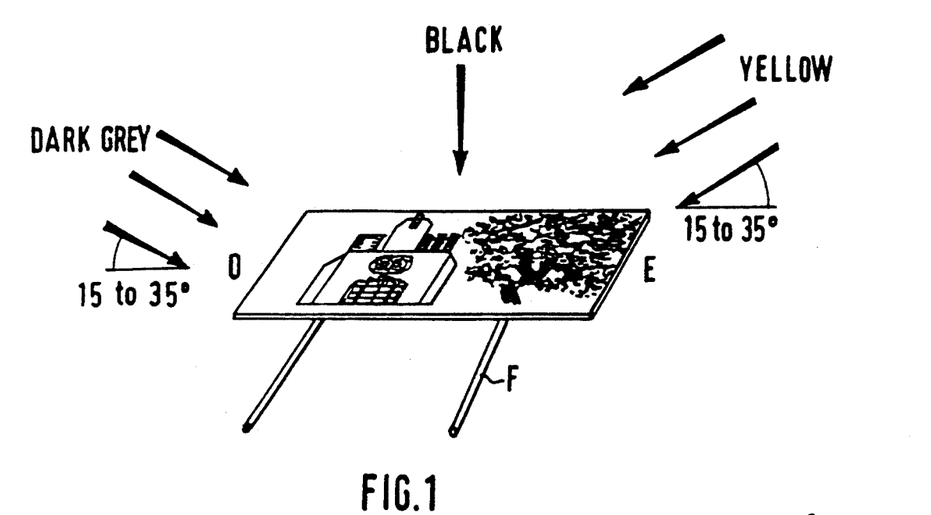
FIG. 1 is an overhead view of a flat object arranged to be sprayed: the 2 bars or wires F support the object and the colours are projected at an angle of 15 to 35 degrees, the black colour being sprayed vertically, in a small quantity.
Figure 2:
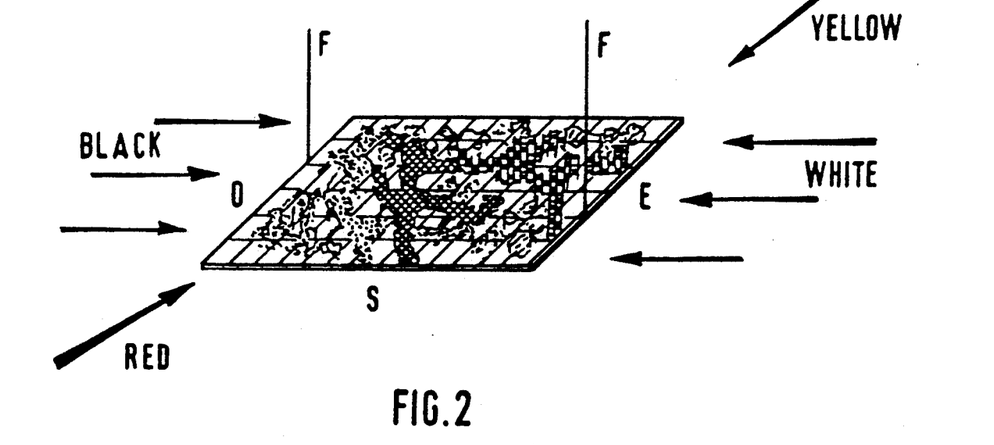
FIG. 2 represents a non-flat object suspended vertically by two bars or wires F, the spraying being effected in the direction of the arrows. A slope (generally from about 15 to 35 degrees) is gfiven for the various "surfaces".
Figure 5A:
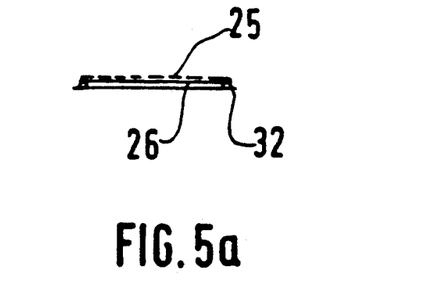

The double water and air circuit shown (FIG. 2) surrounds on three sides 22, 23, 24, inside the arms of the elevator, the text-film deposited on the water. It has a triple function: a) because of its rectangular cross-section consisting of two superimposed square tubes, measuring 8 mm along each side, it prevents the "text-film" from coming against the arms of the elevator; b) by means of an air jet from the upper pipe it maintains the "text-film" against the strip 21, and also enables reduction of the graphic pattern to the desired scale; c) finally, by means of a water flow from the lower pipe it helps remove dust or other unwanted matter, as well as air bubbles present in the "text-film". The two circuits are controlled by the electric valve 30.

Figure 6:
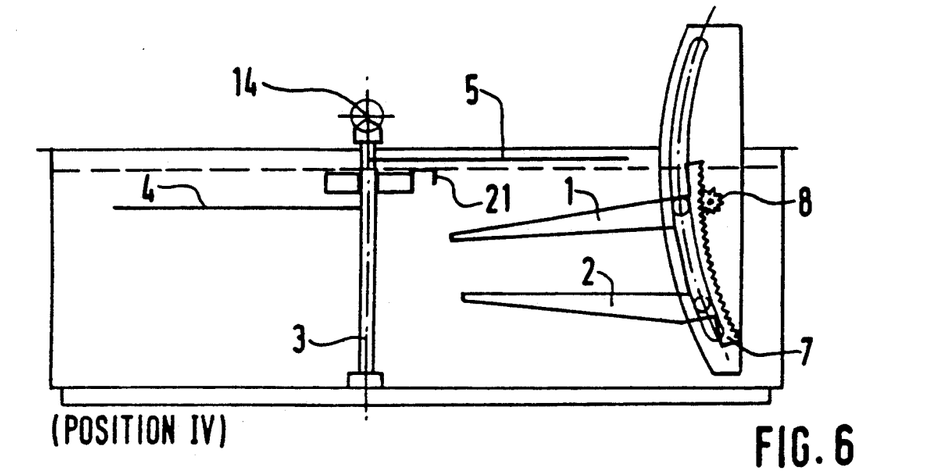
FIGS. 6 to 10 illustrate the device in four positions IV, V, I, II and III.

Operation of this device is as follows:

1 position I: FIG. 6

Initially, the arms 1 in FIG. 3 are loaded with a "text-object" support assembly holding the "text-object", and the arms 2 are loaded with a pallet of plain plates, for example. When the elevator 7 is in this position, the server, whose trays 4 and 5 are empty, is in a neutral position. This position, which recurs at each start and end of a cycle, is necessary to allow the passage of the elevator which is loaded on its way down with the "text-object" and the pallet 27 of decorated objects.

Figure 7:
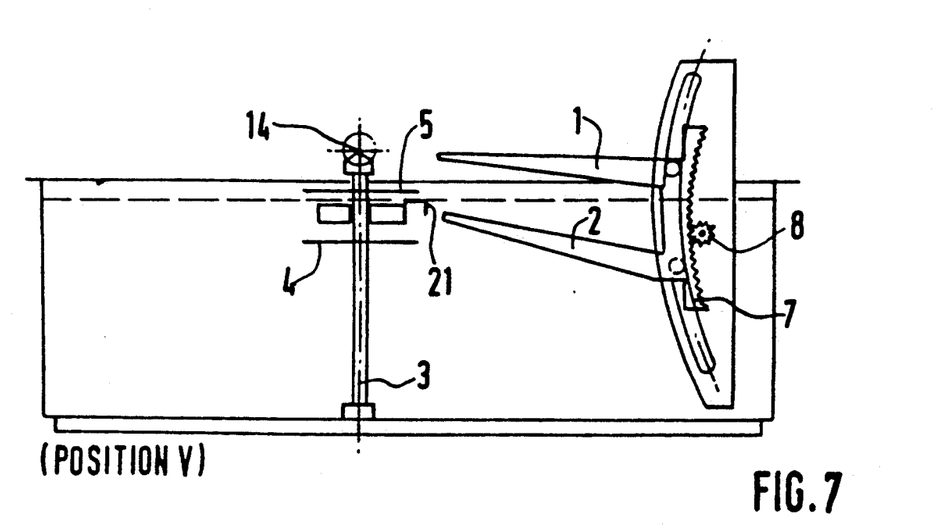

2 Position II: FIG. 7.

As the elevator 7 descends, the "text-film" is deposited on the surface of the water. Simultaneously, because of the synchronization of the rotations of the bevel coupling 14 and gearwheel 8, the trays 4 and 5 of the server come respectively to 4a and 5a. On continuing its path, the elevator deposits the support of the "text-object" on the tray 4a of the server. The upper tray of the server which is located at 5a can be loaded with the new assembly for supporting the "text-object".

Figure 8:
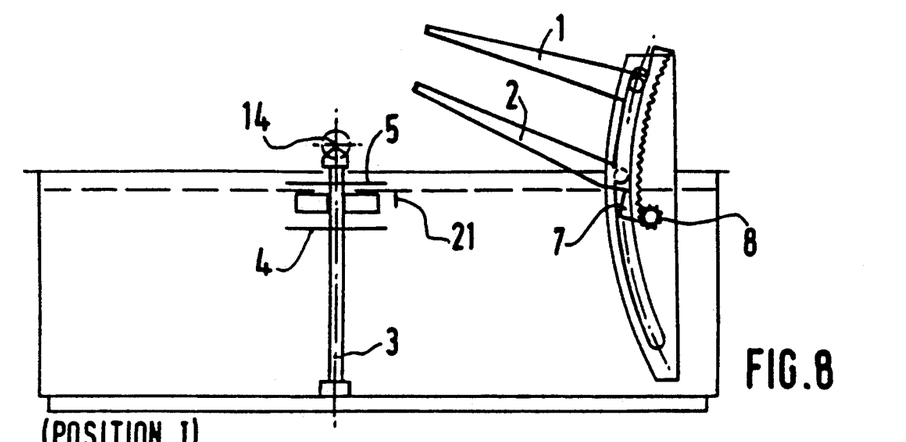

3 Position III FIG. 8.

While the elevator is completing its descent, the server effects a half-rotation; in this position, the upper tray of the server 5a is located between the arms of the elevator at 5, while the lower tray of the server located at 4 can be unloaded.

Figure 9:
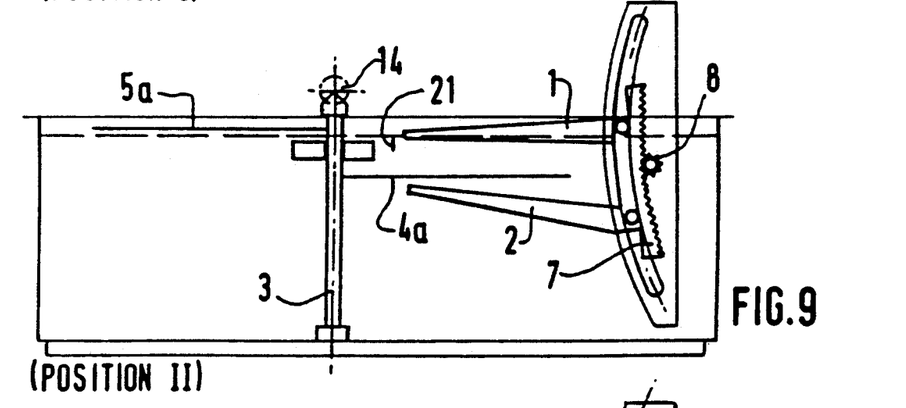

4 Position IV FIG. 9.

As soon as the elevator arrives at the low position IV, a travel-limiting cam reverses the direction of rotation of the gearwheel 8 to raise the elevator which in passing removes, by means of the arm 1 the new support of the "text-object".

Figure 10:
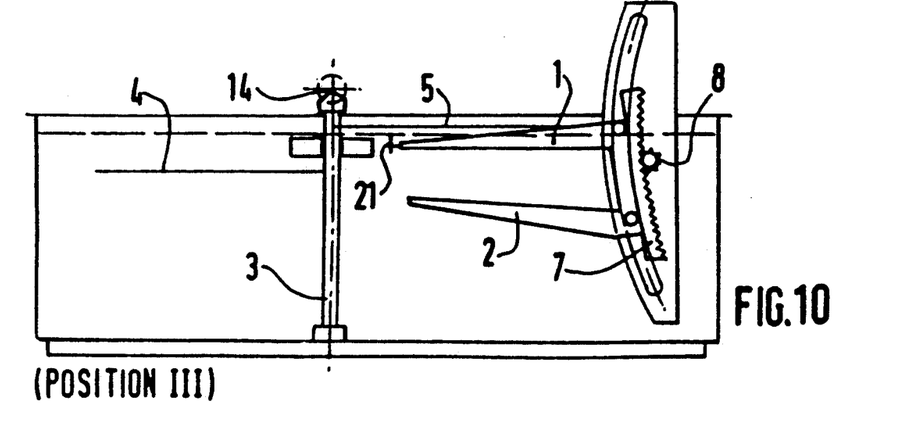

5 Position V FIG. 10.

The elevator continues its upward movement so that the objects to be decorated (in this case plates) which are placed on the pallet loaded on the arms 2 receive the graphic pattern maintained on the water surface. Simultaneously as in position II, and as a result of the synchronization of the rotational movements of the bevel coupling 14 and the gearwheel 8, the empty trays 4 and 5 of the server come into the neutral position (as a corollary to the remarks of paragraph 1 above, the server must effect a quarter turn to begin or complete its function).

When the elevator arrives in the position 1, the device is in the neutral position to allow unloading of the arms 2, which can be effected by the thrust resulting from the arrival of the new pallet. As soon as the new pallet is in position, the cycle starts again.

We claim:

1. A process which is equally useful for obtaining a reproducible decoration on a surface which is either flat or non-flat and which comprises floating a pattern on a liquid surface, the process further comprising:
    selecting or making an object, having a surface which is either essentially flat or volumetric (non-flat),
    spraying the object with powdered dye or pigment, which is in suspension in a liquid vehicle,
    immersing the thus-oriented sprayed object in water so that the dye or pigment floats to the surface of the water as a film and
    transferring the film to a final support.

2. A process according to claim 1, wherein the object, when having a non-flat surface, comprises a tree branch, a dried leaf, a sculpture, a wire assembly or fabric having a thickness of up to about 15 cm and arranged on and secured to wide-mesh netting.

3. A process according to claim 1, wherein the object, when having a flat surface, is held on fine netting.

4. A process according to claim 3, which comprises spraying at least two colours, one dark and another light, and effecting such spraying at an angle in the approximate range of from 15 to 35 degrees for a flat object or for each "face" presented by a non-flat object surface.

5. A process according to claim 1, wherein the liquid vehicle comprises solvent and binder which are miscible with water to at least some extent.

6. A process according to claim 1, which comprises inclining the object while immersing it.

7. A process according to claim 1, wherein the object has an irregular surface.

8. A process according to claim 1 wherein the object has a non-flat surface.

9. A process according to claim 8 for obtaining a reproducible decoration on an essentially flat surface and the object is a drawing, a bas-relief or tree-bark.

10. A process according to claim 1 wherein the immersed and sprayed object does not dissolve in water.

11. A process according to claim 1 wherein the final support is immersed in water while the film is being transferred thereto.

* * * * *